(12) United States Patent
Byun et al.

(10) Patent No.: US 10,912,090 B2
(45) Date of Patent: Feb. 2, 2021

(54) METHOD AND DEVICE FOR TRANSMITTING UPLINK REFERENCE SIGNAL IN WIRELESS COMMUNICATION SYSTEM

(71) Applicant: LG Electronics Inc., Seoul (KR)

(72) Inventors: Ilmu Byun, Seoul (KR); Kijun Kim, Seoul (KR); Jiwon Kang, Seoul (KR); Bonghoe Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/092,699

(22) PCT Filed: Apr. 7, 2017

(86) PCT No.: PCT/KR2017/003799
§ 371 (c)(1),
(2) Date: Oct. 10, 2018

(87) PCT Pub. No.: WO2017/179859
PCT Pub. Date: Oct. 19, 2017

(65) Prior Publication Data
US 2019/0132843 A1  May 2, 2019

Related U.S. Application Data

(60) Provisional application No. 62/320,615, filed on Apr. 10, 2016.

(51) Int. Cl.
*H04W 72/04* (2009.01)
*H04L 5/00* (2006.01)
(Continued)

(52) U.S. Cl.
CPC ....... *H04W 72/0453* (2013.01); *H04L 5/0048* (2013.01); *H04W 74/006* (2013.01);
(Continued)

(58) Field of Classification Search
None
See application file for complete search history.

(56) References Cited

U.S. PATENT DOCUMENTS

2009/0074099 A1* 3/2009 Zheng ............... H04L 1/0017
375/267
2009/0129259 A1* 5/2009 Malladi ............. H04B 7/0417
370/210

(Continued)

FOREIGN PATENT DOCUMENTS

WO    WO2013043006    3/2013

OTHER PUBLICATIONS

International Search Report in International Application PCT/KR2017003799, dated Jul. 10, 2017, 6 pages.

*Primary Examiner* — Andrew C Oh
(74) *Attorney, Agent, or Firm* — Fish & Richardson P.C.

(57) ABSTRACT

Provided are a method and a device for transmitting an uplink reference signal in a wireless communication system. More particularly, a terminal transmits downlink channel information and information about a downlink subband selected on the basis of the downlink channel information. And the terminal receives first resource allocation information indicating an uplink subband mapped to the downlink subband. And the terminal transmits an uplink reference signal by means of the uplink subband.

13 Claims, 15 Drawing Sheets

US 10,912,090 B2
Page 2

(51) Int. Cl.
*H04W 74/00* (2009.01)
*H04W 72/08* (2009.01)

(52) U.S. Cl.
CPC ............ *H04L 5/005* (2013.01); *H04L 5/0051* (2013.01); *H04L 5/0053* (2013.01); *H04W 72/042* (2013.01); *H04W 72/08* (2013.01)

(56) References Cited

U.S. PATENT DOCUMENTS

| | | | |
|---|---|---|---|
| 2009/0238241 A1* | 9/2009 | Hooli | H04L 5/0012 375/133 |
| 2010/0008333 A1* | 1/2010 | Kim | H04L 5/0053 370/336 |
| 2010/0159921 A1 | 6/2010 | Choi et al. | |
| 2010/0197313 A1* | 8/2010 | Suronen | H04W 72/042 455/450 |
| 2011/0138069 A1* | 6/2011 | Momchilov | H04L 65/605 709/231 |
| 2011/0176502 A1* | 7/2011 | Chung | H04L 5/0048 370/329 |
| 2011/0188428 A1* | 8/2011 | Ishii | H04W 72/0406 370/311 |
| 2011/0228863 A1* | 9/2011 | Papasakellariou | H04L 5/0053 375/259 |
| 2011/0310931 A1 | 12/2011 | Mehta et al. | |
| 2011/0319065 A1* | 12/2011 | Dalsgaard | H04W 56/0005 455/418 |
| 2012/0051265 A1* | 3/2012 | Shen | H04L 5/0048 370/254 |
| 2012/0113967 A1* | 5/2012 | Smith | H04B 1/7143 370/338 |
| 2012/0129561 A1* | 5/2012 | Peng | H04L 5/0035 455/513 |
| 2012/0182910 A1* | 7/2012 | Nakashima | H04L 5/001 370/281 |
| 2012/0195284 A1* | 8/2012 | Mann | H04L 1/1671 370/329 |
| 2012/0218968 A1* | 8/2012 | Kim | H04B 7/024 370/329 |
| 2012/0281654 A1* | 11/2012 | Aiba | H04L 5/0007 370/329 |
| 2013/0028134 A1* | 1/2013 | Wang | H04L 5/0048 370/254 |
| 2013/0051356 A1* | 2/2013 | Hong | H04L 27/2602 370/329 |
| 2013/0083702 A1* | 4/2013 | Barany | H04W 28/06 370/261 |
| 2013/0083755 A1* | 4/2013 | Berberana Fernandez-Murias | H04W 72/085 370/329 |
| 2013/0089034 A1* | 4/2013 | Acharya | H04W 48/20 370/329 |
| 2013/0121280 A1* | 5/2013 | Ouchi | H04L 5/0048 370/329 |
| 2013/0128855 A1* | 5/2013 | Noh | H04L 5/0051 370/329 |
| 2013/0194951 A1* | 8/2013 | Kim | H04L 5/0053 370/252 |
| 2013/0258978 A1* | 10/2013 | Aiba | H03M 13/6356 370/329 |
| 2013/0272263 A1* | 10/2013 | Pi | H04B 7/0626 370/330 |
| 2013/0294381 A1* | 11/2013 | Wang | H04L 5/0051 370/329 |
| 2013/0294382 A1* | 11/2013 | Xu | H04L 5/0048 370/329 |
| 2014/0036737 A1* | 2/2014 | Ekpenyong | H04W 8/245 370/280 |
| 2014/0036862 A1* | 2/2014 | Lorca Hernando | H04W 72/085 370/330 |
| 2014/0177542 A1* | 6/2014 | Novak | H04W 72/042 370/329 |
| 2014/0241262 A1* | 8/2014 | Novak | H04W 72/042 370/329 |
| 2015/0009951 A1* | 1/2015 | Josiam | H04L 5/0051 370/330 |
| 2015/0078271 A1* | 3/2015 | Kim | H04L 5/0051 370/329 |
| 2015/0078284 A1 | 3/2015 | Lee et al. | |
| 2015/0305027 A1* | 10/2015 | Liu | H04L 5/0073 370/336 |
| 2015/0319703 A1* | 11/2015 | Kwon | H04W 52/40 370/329 |
| 2016/0044672 A1* | 2/2016 | Quan | H04W 72/0446 370/280 |
| 2016/0143035 A1* | 5/2016 | Xue | H04W 72/048 370/329 |
| 2016/0183275 A1* | 6/2016 | Inoue | H04B 7/0695 455/450 |
| 2016/0192356 A1* | 6/2016 | Lee | H04L 5/1469 370/280 |
| 2016/0204924 A1* | 7/2016 | Li | H04L 5/0053 370/280 |
| 2016/0219579 A1* | 7/2016 | Yamazaki | H04W 72/042 |
| 2016/0269157 A1* | 9/2016 | Soriaga | H04B 7/0617 |
| 2016/0277065 A1* | 9/2016 | Xie | H04L 5/0051 |
| 2016/0323909 A1* | 11/2016 | Lin | H04J 3/1694 |
| 2016/0352667 A1* | 12/2016 | Pickett | H04L 67/22 |
| 2017/0048039 A1* | 2/2017 | Zhao | H04L 25/0226 |
| 2017/0230954 A1* | 8/2017 | Au | H04L 5/005 |
| 2017/0238190 A1* | 8/2017 | Yang | H04L 5/0048 370/329 |
| 2017/0353222 A1* | 12/2017 | Wei | H04L 5/0053 |
| 2018/0062710 A1* | 3/2018 | Qian | H04B 7/0452 |
| 2018/0110041 A1* | 4/2018 | Bendlin | H04L 27/2613 |
| 2018/0124749 A1* | 5/2018 | Park | H04W 74/08 |
| 2018/0254851 A1* | 9/2018 | Roessel | H04L 1/009 |
| 2018/0359122 A1* | 12/2018 | Lee | H04L 5/0044 |
| 2019/0089423 A1* | 3/2019 | Davydov | H04B 7/0478 |

* cited by examiner

METHOD AND DEVICE FOR TRANSMITTING UPLINK REFERENCE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2017/003799, filed on Apr. 7, 2017, which claims the benefit of U.S. Provisional Application No. 62/320,615 filed on Apr. 10, 2016, the contents of which are all hereby incorporated by reference herein in their entirety.

BACKGROUND OF THE INVENTION

Field of the Invention

The present specification relates to wireless communication, and more particularly, to a method of transmitting an uplink reference signal in a wireless communication system, and a device using the method.

Related Art

A wireless communication system has been studied to support a higher data rate in order to meet a demand for persistently increasing wireless data traffic. As one of approaches for this, a base station based on beamforming which utilizes a wide frequency band in a millimeter wave (mmWave) band may be used to expect a dramatic increase in capacity of a cellular system.

Meanwhile, in order to transmit a plurality of pieces of information to a single user or multiple users, a multiple input multiple output (MIMO) system considered in a standard such as the conventional long term evolution (LTE)-advanced or the like has a plurality of digital paths or radio frequency (RF) chains.

When performing MIMO communication by using the plurality of digital paths, a performance gain such as a diversity gain or a multiplexing gain can be obtained. However, when the number of digital paths is increased to obtain a greater gain, there may be a problem of synchronization, cost, and operational complexity between digital paths.

In order to satisfy 20 Gbps as a requirement of a next generation wireless communication system, a broadband communication system having a bandwidth of at least 100 MHz to 200 MHz is required. Since it is currently difficult to secure a wide bandwidth at a frequency lower than or equal to 6 GHz, a high frequency using a frequency higher than or equal to 6 GHz is actively being developed. At the high frequency, cell coverage is short due to a path attenuation, and thus a traffic fluctuation may be serious inside a cell. Therefore, it is considered to introduce a broadband time division duplex (TDD) communication system which can flexibly cope with the traffic fluctuation.

SUMMARY OF THE INVENTION

The present specification provides a method and device for transmitting an uplink reference signal in a wireless communication system.

The present specification proposes a method of transmitting an uplink reference signal in a wireless communication system.

First, terminologies will be summarized. A radio resource used in a wireless communication system described in the present specification may be classified into a best band (BB) and a residual band (RB) in a frequency domain. The BB may correspond to a specific sub-band selected from a plurality of sub-bands. The RB may correspond to sub-bands remaining after excluding the BB from a whole band. The whole band may include the plurality of sub-bands. An uplink channel may include an uplink control channel or an uplink data channel. The downlink channel may include a downlink control channel or a downlink data channel.

First, a user equipment (UE) transmits downlink channel information and information regarding a downlink sub-band selected based on the downlink channel information to a base station (BS).

The downlink sub-band may be a BB in which quality of a downlink channel is higher than a predetermined value among the plurality of sub-bands. In addition, the downlink channel information may include a channel quality indicator (CQI) of the BB, reference signal received power (RSRP) of the BB, or reference signal received quality (RSRQ) of the BB. That is, in a broadband time division duplex (TDD) communication system, the UE has to first transmit downlink channel information to the BS for beam scanning. Accordingly, the UE may transmit an estimation value of a downlink channel having good quality and may inform the BS of information regarding a downlink sub-band having good downlink channel quality.

The UE receives first resource allocation information, which indicates an uplink subframe mapped to the downlink sub-band, from the BS.

The UE transmits an uplink reference signal to the BS through the uplink sub-band.

In addition, the UE may receive second resource allocation information which indicates a resource in the uplink sub-band. The uplink reference signal may be transmitted through the resource in the uplink sub-band on the basis of the second resource allocation information. The first resource allocation information may correspond to allocation information regarding an uplink sub-band mapped to a downlink sub-band selected by the UE. The second resource allocation information may correspond to allocation information regarding a specific resource on which an uplink reference signal is transmitted in the uplink sub-band.

For example, the first resource allocation information and the second resource allocation information are received through physical layer signaling. At least one of the number of uplink sub-bands, a subframe index in a resource in the uplink sub-band, a transmission period of the uplink reference signal, and a transmission duration of the uplink reference signal may be received through higher layer signaling. The subframe index of the resource in the uplink sub-band may correspond to an index of a subframe in which an uplink reference signal is transmitted. Only allocation information of the uplink sub-band may be transmitted through physical layer signaling, and the remaining information may be transmitted through higher layer signaling, thereby decreasing an overhead of the physical layer signaling.

For another example, the second resource allocation information is received through physical layer signaling. At least one of the first resource allocation information, the number of uplink sub-bands, a subframe index in a resource in the uplink sub-band, a transmission period of the uplink reference signal, and a transmission duration of the uplink reference signal may be received through higher layer signaling. The subframe index of the resource in the uplink sub-band may correspond to an index of a subframe in which an uplink reference signal is transmitted.

For another example, all of the first resource allocation information and the second resource allocation information may be transmitted through higher layer signaling such as RRC signaling.

For another example, the downlink channel information is transmitted in a second subframe which is ahead, by a predetermined value, of a first subframe in which the first resource allocation information and the second resource allocation information are received. The first resource allocation information and the second resource allocation information may be determined based on the downlink channel information. This is an example of showing a case where a time corresponding to a specific subframe is required to process downlink channel information received by the BS from the UE. That is, if the downlink channel information is processed and the first resource allocation information and the second resource allocation information are received within the specific subframe, the first resource allocation information and the second resource allocation information cannot be interpreted by using the downlink channel information.

For another example, the resource in the uplink sub-band is subjected to frequency hopping for each of the uplink sub-bands. A pattern of the frequency hopping performed for each of the uplink sub-bands is configured identically. That is, the UE may transmit an uplink reference signal for the resource subjected to frequency hopping within the uplink sub-band. This is because a sub-band also has sufficient subcarriers in a broadband system. In addition, when the pattern of frequency hopping varies for each sub-band, a degree of freedom for scheduling of the BS may increase, whereas an overhead of physical layer signaling may increase. Therefore, the BS identically sets the pattern of frequency hopping of each uplink sub-band.

In addition, the first resource allocation information may include bitmap information indicating a sub-band for transmitting the uplink reference signal among the uplink sub-bands. Therefore, the BS may inform that an uplink reference signal can be transmitted for all uplink sub-bands mapped to the downlink sub-bands, or may inform that the uplink reference signal can be transmitted only in a specific sub-band indicated by the bitmap information of the uplink sub-band mapped to the downlink sub-band.

A subframe used in the wireless communication system described in the present specification may correspond to a self-contained frame. The first subframe and the second subframe may also correspond to the self-contained frame. That is, a symbol for transmitting downlink channel information, a symbol for transmitting data, and a symbol for transmitting uplink channel information are deployed in the subframe in a time division multiplexing (TDM) manner. According to a channel reciprocity characteristic based on the self-contained frame, a similarity between an uplink control channel and a downlink control channel may increase.

In addition, the present specification proposes a device for transmitting an uplink reference signal in a wireless communication system.

First, terminologies will be summarized. A radio resource used in a wireless communication system described in the present specification may be classified into a best band (BB) and a residual band (RB) in a frequency domain. The BB may correspond to a specific sub-band selected from a plurality of sub-bands. The RB may correspond to sub-bands remaining after excluding the BB from a whole band. The whole band may include the plurality of sub-bands. An uplink channel may include an uplink control channel or an uplink data channel. The downlink channel may include a downlink control channel or a downlink data channel.

The device may be a UE. The device includes a radio frequency (RF) unit transmitting and receiving a radio signal, and a processor operatively coupled to the RF unit. First, the processor transmits downlink channel information and information regarding a downlink sub-band selected based on the downlink channel information to a BS.

The downlink sub-band may be a BB in which quality of a downlink channel is higher than a predetermined value among the plurality of sub-bands. In addition, the downlink channel information may include a CQI of the BB, RSRP of the BB, or RSRQ of the BB. That is, in a broadband TDD communication system, the UE has to first transmit downlink channel information to the BS for beam scanning. Accordingly, the UE may transmit an estimation value of a downlink channel having good quality and may inform the BS of information regarding a downlink sub-band having good downlink channel quality.

The processor receives first resource allocation information, which indicates an uplink subframe mapped to the downlink sub-band, from the BS.

The processor transmits an uplink reference signal to the BS through the uplink sub-band.

In addition, the processor may receive second resource allocation information which indicates a resource in the uplink sub-band. The uplink reference signal may be transmitted through the resource in the uplink sub-band on the basis of the second resource allocation information. The first resource allocation information may correspond to allocation information regarding an uplink sub-band mapped to a downlink sub-band selected by the UE. The second resource allocation information may correspond to allocation information regarding a specific resource for which an uplink reference signal is transmitted in the uplink sub-band.

For example, the first resource allocation information and the second resource allocation information are received through physical layer signaling. At least one of the number of uplink sub-bands, a subframe index in a resource in the uplink sub-band, a transmission period of the uplink reference signal, and a transmission duration of the uplink reference signal may be received through higher layer signaling. The subframe index of the resource in the uplink sub-band may correspond to an index of a subframe in which an uplink reference signal is transmitted. Only allocation information of the uplink sub-band may be transmitted through physical layer signaling, and the remaining information may be transmitted through higher layer signaling, thereby decreasing an overhead of the physical layer signaling.

For another example, the second resource allocation information is received through the physical layer signaling. At least one of the first resource allocation information, the number of uplink sub-bands, a subframe index in a resource in the uplink sub-band, a transmission period of the uplink reference signal, and a transmission duration of the uplink reference signal may be received through higher layer signaling. The subframe index of the resource in the uplink sub-band may correspond to an index of a subframe in which an uplink reference signal is transmitted.

For another example, all of the first resource allocation information and the second resource allocation information may be transmitted through higher layer signaling such as RRC signaling.

For another example, the downlink channel information is transmitted in a second subframe which is ahead, by a predetermined value, of a first subframe in which the first resource allocation information and the second resource allocation information are received. The first resource allocation information and the second resource allocation information may be determined based on the downlink channel information. This is an example of showing a case where a time corresponding to a specific subframe is required to process downlink channel information received by the BS from the UE. That is, if the downlink channel information is processed and the first resource allocation information and the second resource allocation information are received within the specific subframe, the first resource allocation information and the second resource allocation information cannot be interpreted by using the downlink channel information.

For another example, the resource in the uplink sub-band is subjected to frequency hopping for each of the uplink sub-bands. A pattern of the frequency hopping performed for each of the uplink sub-bands is configured identically. That is, the UE may transmit an uplink reference signal for the resource subjected to frequency hopping within the uplink sub-band. This is because a sub-band also has sufficient subcarriers in a broadband system. In addition, when the pattern of frequency hopping varies for each sub-band, a degree of freedom of scheduling of the BS may increase, but an overhead of physical layer signaling may increase. Therefore, the BS identically sets the pattern of frequency hopping of each uplink sub-band.

In addition, the first resource allocation information may include bitmap information indicating a sub-band for transmitting the uplink reference signal among the uplink sub-bands. Therefore, the BS may inform that an uplink reference signal can be transmitted for all uplink sub-band mapped to the downlink sub-band, or may inform that the uplink reference signal can be transmitted only in a specific sub-band indicated by the bitmap information of the uplink sub-band mapped to the downlink sub-band.

A subframe used in the wireless communication system described in the present specification may correspond to a self-contained frame. The first subframe and the second subframe may also correspond to the self-contained frame. That is, a symbol for transmitting downlink channel information, a symbol for transmitting data, and a symbol for transmitting uplink channel information are deployed in a time division multiplexing (TDM) manner in the subframe. According to a channel reciprocity characteristic based on the self-contained frame, a similarity between an uplink control channel and a downlink control channel may increase.

According to a method of the present specification, an uplink reference signal can be transmitted only in a specific band by using a channel reciprocity characteristic of a TDD communication system. Therefore, the uplink reference signal can be transmitted effectively in terms of energy and resources in comparison with the conventional method.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE. However, technical features of the present invention are not limited thereto.

Figure 1:
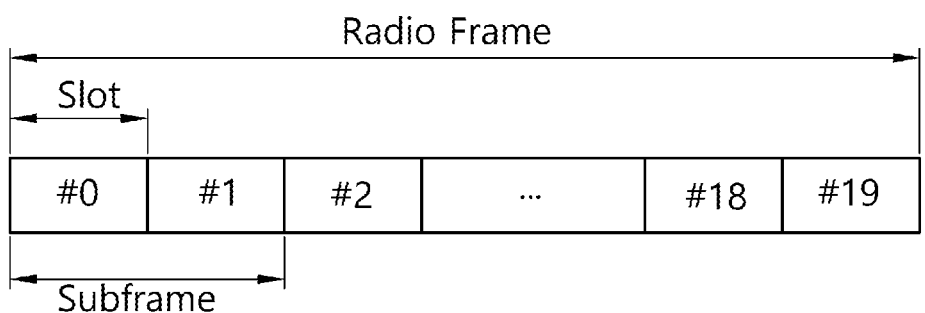
FIG. 1 shows a structure of a radio frame in 3GPP LTE.

FIG. 1 shows a structure of a radio frame in 3GPP LTE.
Referring to FIG. 1, the radio frame consists of 10 subframes. One subframe consists of 2 slots. The slots in the radio frame are numbered from slot number 0 to 19. A time required for transmitting one subframe is defined as a transmission time interval (TTI). The TTI is a unit of scheduling for transmitting a data. For example, one subframe may have a length of 1 millisecond (ms), and one slot may have a length of 0.5 ms.

The structure of the radio frame is for exemplary purposes only, and the number of subframes included in the radio frame or the number of slots included in the subframe and the number of SC-FDMA symbols included in the slot can change variously.

Figure 2:
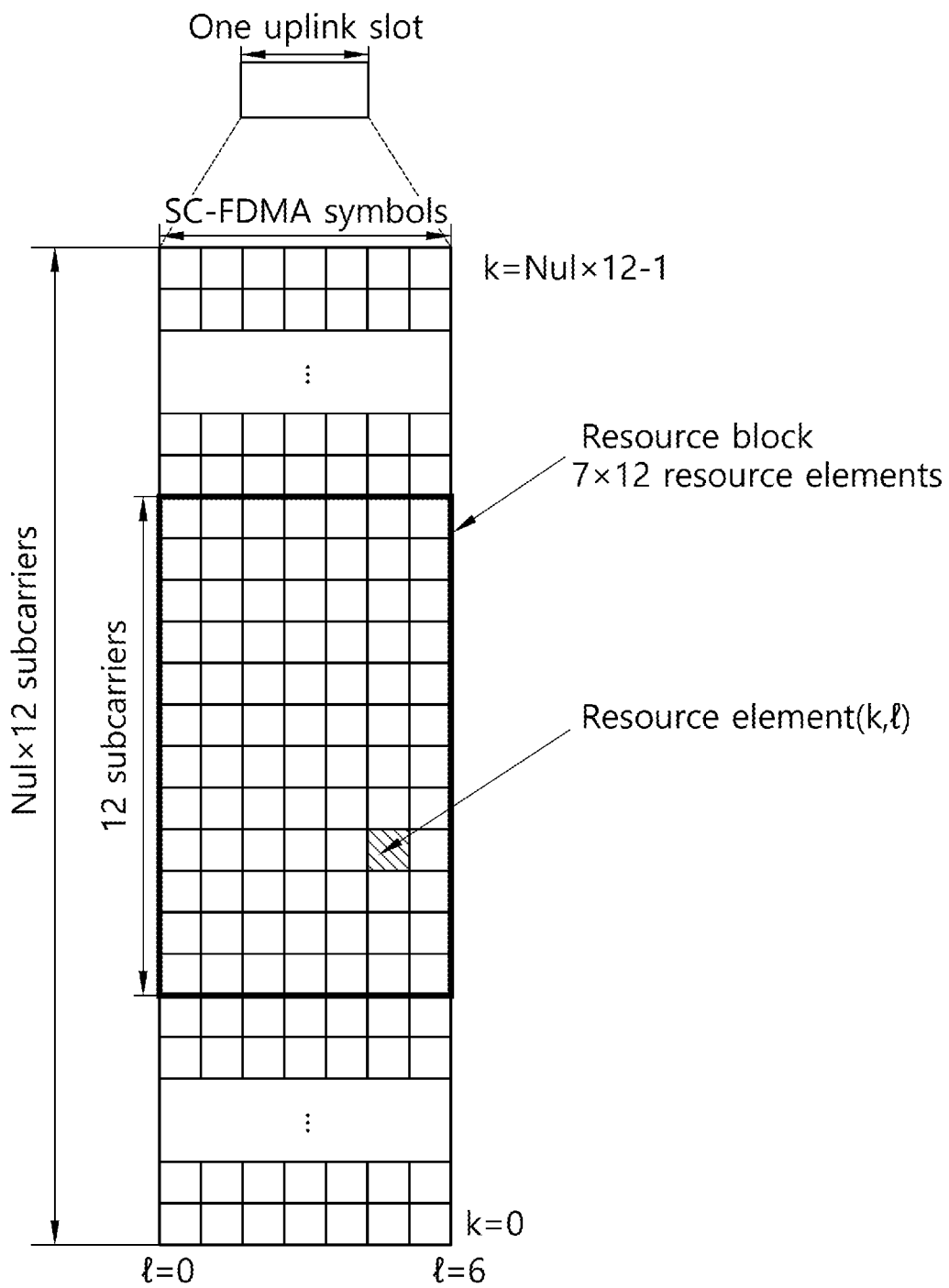
FIG. 2 is a diagram showing an example of a resource grid for one uplink slot in 3GPP LTE.

FIG. 2 is a diagram showing an example of a resource grid for one uplink slot in 3GPP LTE.

Referring to FIG. 2, The UL slot includes a plurality of SC-FDMA symbols in a time domain and includes a plurality of $N^{UL}$ RBs in a frequency domain. It is described that the SC-FDMA symbols are for representing one symbol period, and the SC-FDMA symbols can be OFDM symbols or symbol period according to the system. The RBs are a unit of resource allocation in the frequency domain and include 12 subcarriers. The number $N^{UL}$ of RBs included in the UL slot depends on a UL bandwidth defined in a cell. The UL bandwidth is system information. The UE may know $N^{UL}$ by acquiring the system information.

Each element on the resource grid is referred to as a resource element. One RB includes 12×7 resource elements. The resource element on the resource grid can be identified by an index pair (k, l) within the slot. Herein, k(k=0, . . . , $N^{UL}$×12−1) denotes a subcarrier index in the frequency domain, and l(l=0, . . . , 6) denotes an SC-FDMA symbol index in the time domain.

Although it is described herein that one RB includes 7×12 resource elements consisting of 7 SC-FDMA symbols in the time domain and 12 subcarriers in the frequency domain for example, the number of SC-FDMA symbols and the number of subcarriers in the RB are not limited thereto. Thus, the number of subcarriers or the number of SC-FDMA symbols included in the RB may change variously. The number of SC-FDMA symbols may change depending on a cyclic prefix (CP) length. For example, when using a normal CP, the number of SC-FDMA symbols included in one slot is 7, and when using an extended CP, the number of SC-FDMA symbols included in one slot is 6.

In 3GPP LTE of FIG. 2, a resource grid for a single uplink slot may also be applied to a resource grid for a downlink slot. In this case, the downlink slot includes a plurality of orthogonal frequency division multiplexing (OFDM) symbols in a time domain.

Figure 3:
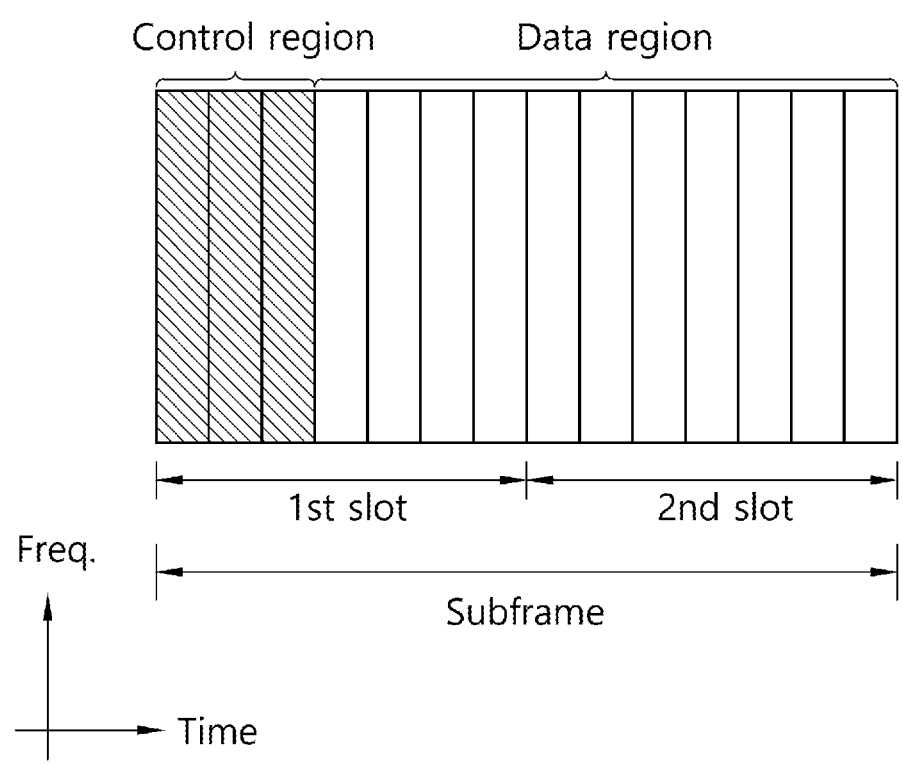
FIG. 3 shows an example of a structure of a downlink subframe in 3GPP LTE.

FIG. 3 shows an example of a structure of a downlink subframe in 3GPP LTE.

Referring to FIG. 3, a downlink subframe includes two contiguous slots. In the first slot of the downlink subframe, a maximum of the former three OFDM symbols become a control region to which a physical downlink control channel (PDCCH) is allocated, and the remaining OFDM symbols become a data region to which physical downlink shared channels (PDSCHs) are allocated. Control channels, such as a physical control format indicator channel (PCFICH) and a physical hybrid-ARQ indicator channel (PHICH), in addition to a PDCCH may be allocated to the control region. In this case, the inclusion of the three OFDM symbols in the control region is only an example. The number of OFDM symbols included in the control region of a subframe may be aware through a PCFICH. A PHICH carries hybrid automatic repeat request (HARQ) acknowledgement (ACK)/not-acknowledgement (NACK) information as a response to uplink data transmission.

A PDCCH may carry a downlink grant that provides notification of the resource allocation of downlink transmission on a PDSCH. UE may read downlink user data transmitted through a PDSCH by decoding control information transmitted through the PDCCH. Furthermore, the PDCCH may carry control information, used for physical uplink shared channel (PUSCH) scheduling, to the UE. The control information used for PUSCH scheduling is an uplink grant that provides notification of the resource allocation of uplink transmission.

A control region consists of an aggregation of a plurality of control channel elements (CCEs). A PDCCH is transmitted on an aggregation of one or some contiguous CCEs. A CCE corresponds to a plurality of resource element groups. A resource element group is used to define the mapping of a control channel to a resource element. In a downlink subframe, if a total number of CCEs is $N_{cce}$, CCE indices of 0 to $N_{cce}$,k−1 are assigned to CCEs. A total number of CCEs within a subframe may also be different in each subframe because the number of OFDM symbols included in a control region within a subframe may be different in each subframe.

Figure 4:
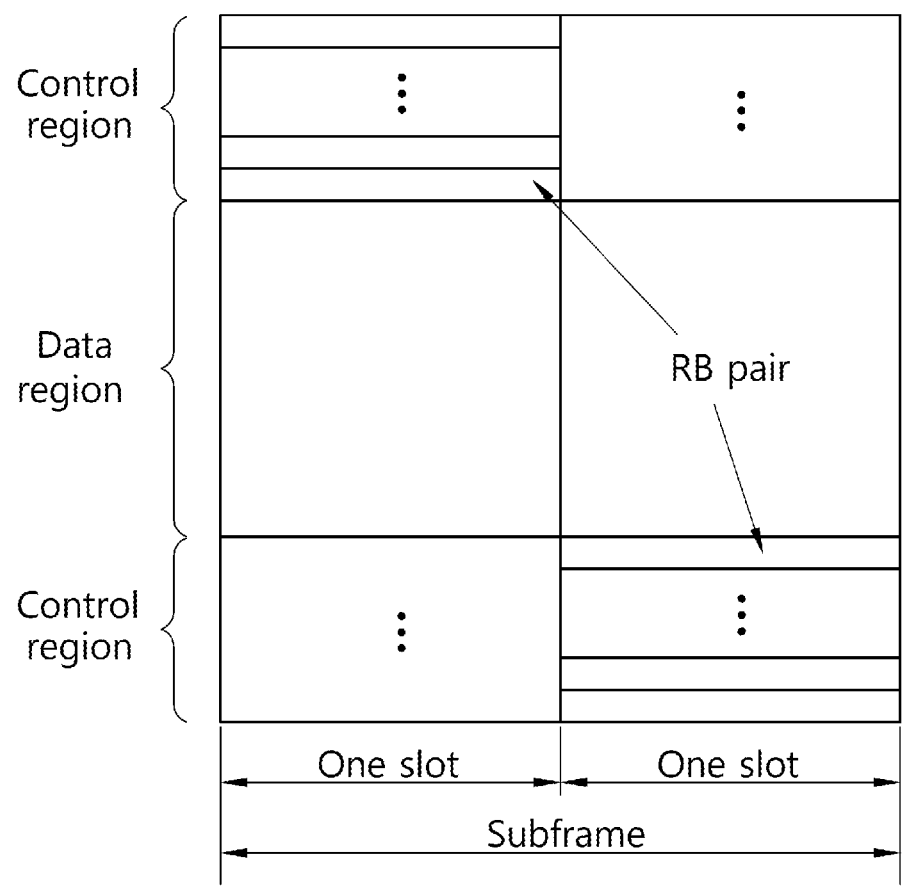
FIG. 4 shows a structure of an uplink subframe in 3GPP LTE.

FIG. 4 shows a structure of an uplink subframe in 3GPP LTE.

The uplink subframe can be divided into a control region and a data region. A physical uplink control channel (PUCCH) for carrying uplink control information is allocated to the control region. A physical uplink shared channel (PUSCH) for carrying data is allocated to the data region.

When indicated by a higher layer, a UE can support simultaneous transmission of the PUSCH and the PUCCH.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH. Examples of the control information to be multiplexed with data may include a channel quality indicator (CQI), a precoding matrix indicator (PMI), HARQ, a rank indicator (RI), etc. Alternatively, the uplink data may consist of only the control information.

Hereinafter, a PUCCH is described.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary. Since the UE transmits the uplink control information on a time basis through different subcarriers, a frequency diversity gain can be obtained. m is a location index indicating a logical frequency domain location of a RB pair allocated to a PUCCH in a subframe.

The PUCCH carries various types of control information according to a format. A PUCCH format 1 carries a scheduling request (SR). In this case, an on-off keying (OOK) scheme can be used. A PUCCH format 1a carries an ACK/NACK modulated using bit phase shift keying (BPSK) with respect to one codeword. A PUCCH format 1b carries an ACK/NACK modulated using quadrature phase shift keying (QPSK) with respect to two codewords. A PUCCH format 2 carries a channel quality indicator (CQI) modulated using QPSK. PUCCH formats 2a and 2b carry the CQI and the ACK/NACK.

Hereinafter, a beamforming technique is described.

Beamforming may be classified into transmission beamforming performed in a transmitting end and reception beamforming performed in a receiving end. The transmission beamforming generally uses a plurality of antennas to increase directivity by concentrating a radio wave arrival region in a specific direction. In this case, a shape in which the plurality of antennas are aggregated may be referred to as an antenna array, and each antenna included in the antenna array may be referred to as an array element. The antenna array may be configured in various shapes such as a linear array, a planar array, or the like. In addition, the use of the transmission beamforming results in an increase in directivity of a signal, which leads to an increase in a transmission distance of the signal. In addition, since the signal is almost not transmitted in a direction other than a direction in which the signal is directed, signal interference for other receiving ends is significantly decreased in the receiving end.

The receiving end may perform beamforming for a reception signal by using a reception antenna array. The reception beamforming increases sensitivity of a reception signal received in the specific direction by concentrating the reception of the radio wave in the specific direction, and provides an advantage of barring an interference signal by excluding a signal incoming in a direction other than the specific direction from the reception signal.

Figure 5:
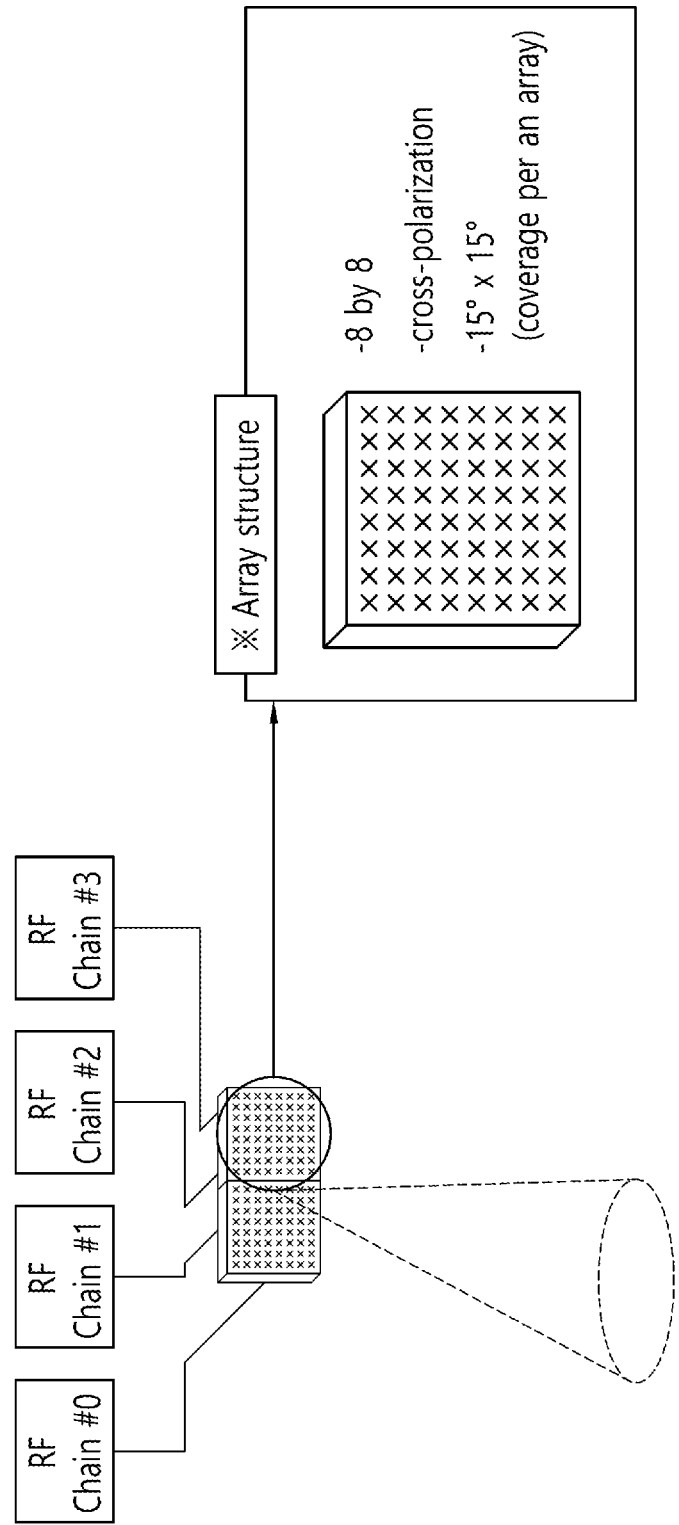
FIG. 5 shows an example of a single beam and an antenna structure based on an antenna array.

FIG. 5 shows an example of a single beam and an antenna structure based on an antenna array.

Referring to FIG. 5, one radio frequency (RF) beam (or a single beam) is defined by using one antenna array including two sub-arrays. In this case, one sub-array consists of 8(H)×8(V)×2(P) antennas (where P denotes Xpol), and has two RF chains. In addition, the single RF beam has a width of 15'(H)×15'(V).

Figure 6:
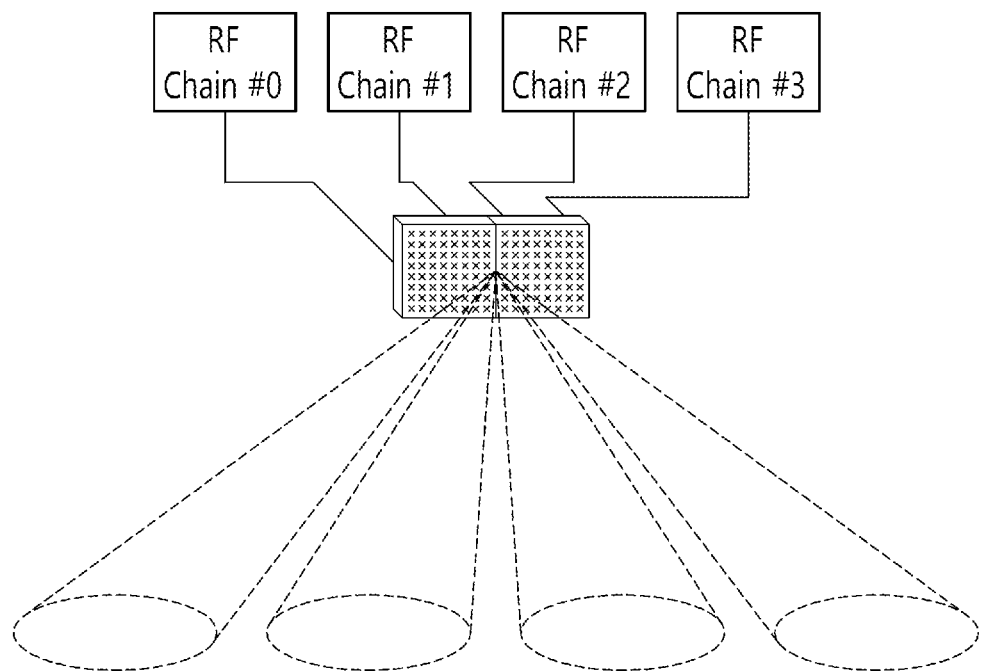
FIG. 6 is an example showing a multi-beam and an antenna structure based on an antenna array.

FIG. 6 is an example showing a multi-beam and an antenna structure based on an antenna array.

Referring to FIG. 6, an RF beam (or a multi-beam) having a different direction for each RF chain is defined. In this case, four beams based on the respective RF chains may cover different regions.

When beam scanning is performed by using the single beam or the multi-beam, there are pros and cons as shown in Table 1 below.

TABLE 1

|  | Single beam | Multi-beam |
| --- | --- | --- |
| Pros | Higher beam gain | Faster beam scanning |
| Cons | Slower beam scanning | Lower beam gain |

Figure 7:
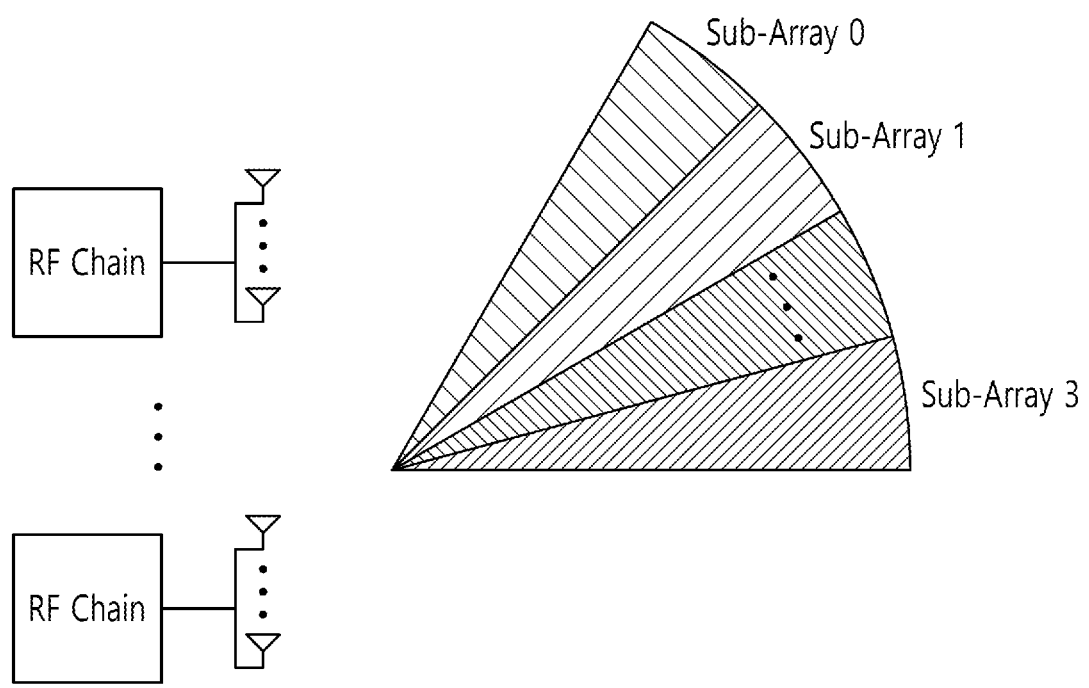
FIG. 7 shows a wide beam using a plurality of narrow beams.

FIG. 7 shows a wide beam using a plurality of narrow beams.

When the multi-beam of FIG. 6 is properly located, the wide beam may be presented as shown in FIG. 7.

FIG. 7 shows a wide beam by utilizing four sub-arrays. It is assumed in the present specification that a transceiver transmits a synchronization signal by using the wide beam. That is, it is assumed that all sub-arrays transmit the same primary synchronization signal (PSS)/secondary synchronization signal (SSS)/physical broadcast channel (PBCH). Meanwhile, a beam gain decreases when it is defined that a plurality of beams cover a wide region. To compensate this, a power gain may be additionally provided through repetitive transmission in a time axis. A synchronization subframe structure based on the repetitive transmission may be as shown in FIG. 8.

Figure 8:
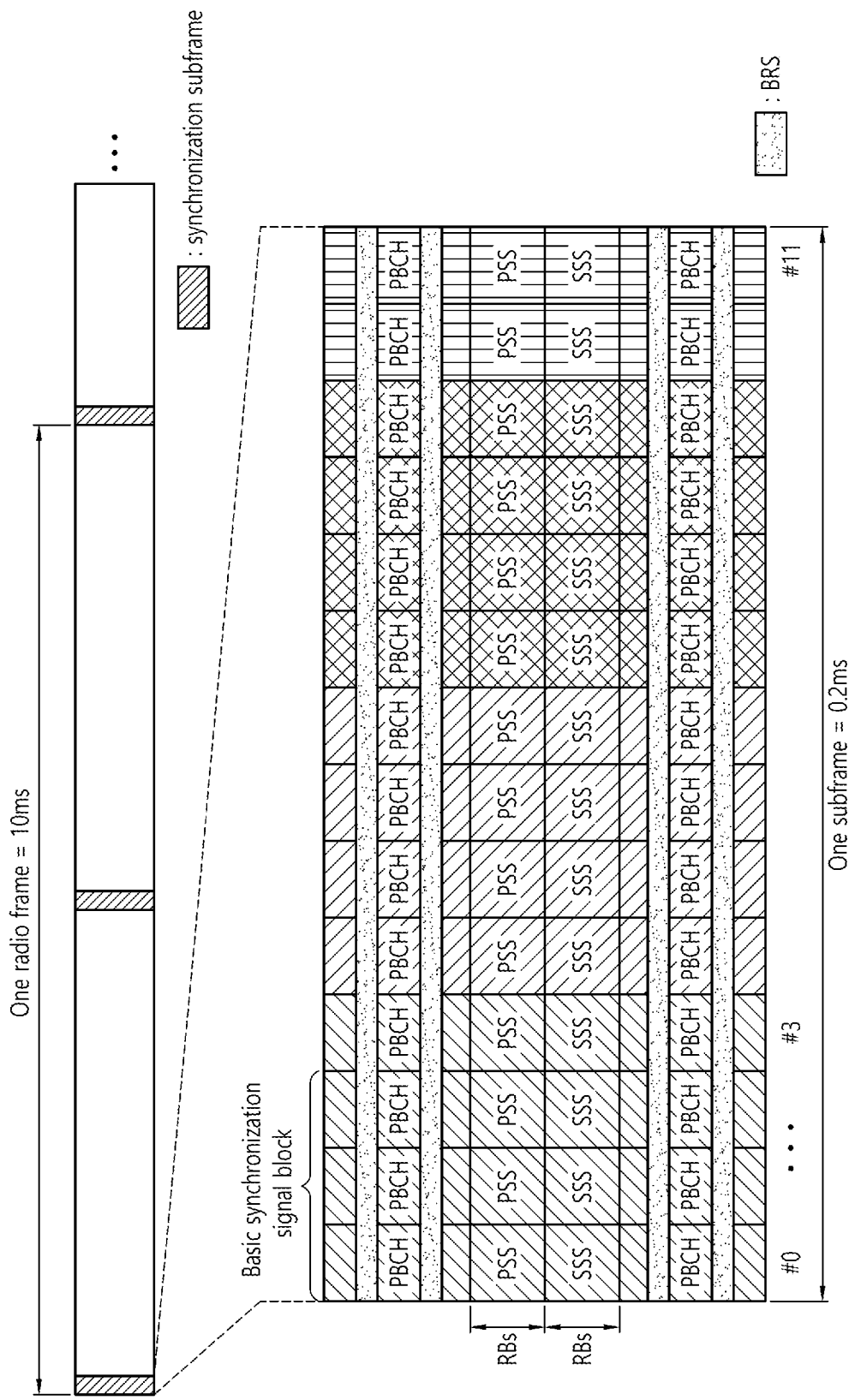
FIG. 8 shows an example of a synchronization subframe structure including a synchronization signal and a beam reference signal (BRS) according to an embodiment of the present specification.

FIG. 8 shows an example of a synchronization subframe structure including a synchronization signal and a beam reference signal (BRS) according to an embodiment of the present specification.

In FIG. 8, a structure of a synchronization signal is shown, and PSS/SSS/PBCH are defined. In this case, blocks with the same shade mean an OFDM symbol group to which the same RF beam group (defined using four sub-array beams) is applied. That is, four OFDM symbols use the same multi-RF beam.

Hereinafter, a synchronization subframe including a synchronization signal and a beam reference signal (BRS) is described in greater detail.

A reference signal such as a channel state indicator (CSI)-reference signal (RS) is transmitted in a time division multiplexing (TDM), frequency division multiplexing (FDM), or code division multiplexing (CDM) manner distinctively for a plurality of beams supported by a BS. The CSI-RS has a beam radiation angle of about 120 degrees for each antenna port. However, a BRS which may be applied in the embodiment of the present specification is a reference signal used for feedback of beam status information for a plurality of beams. The BRS may be applied to a sharp beam due to a small beam radiation angle in comparison with the CSI-RS. In addition, the BRS may be transmitted during at least one subframe by being multiplexed in the FDM manner for each antenna port in one symbol.

A subframe in which the BRS is transmitted may be called a synchronization subframe. The synchronization subframe may have 12 or 14 symbols, and may be transmitted according to a transmission period by which one synchronization subframe is transmitted every 5 ms. It is assumed herein that the synchronization subframe has 14 symbols (two slots) by considering a normal CP case. The symbol may correspond to an OFDM symbol.

A UE uses the PSS and/or the SSS to acquire downlink synchronization and thereafter selects an optimal beam. Referring to FIG. 8, a synchronization signal such as the PSS and/or the SSS occupies a relatively small band with respect to a center frequency. On the other hand, the BRS occupies a full system band, and thus has an advantage in that a discovery for the optimal beam is possible with respect to a broadband channel.

In addition, the PSS and/or the SSS are multiplexed in the FDM manner within one symbol. In addition, the BRS is also multiplexed with the synchronization signal such as the PSS and/or the SSS in the FDM manner within one symbol. In case of an mmWave band, since a sharp beam is used, a synchronization subframe of FIG. 8 may be used to cover the entire region in which a beam radiation angle is 120 degrees.

In addition, as shown in FIG. 8, a PBCH may also be transmitted by being multiplexed in the FDM manner together with the BRS. The PBCH is a signal for transmitting core information (e.g., a system frame number, a BRS transmission period configuration, an ePBCH transmission indicator, etc.) of a system.

Hereinafter, a self-contained frame is described.

Figure 9:
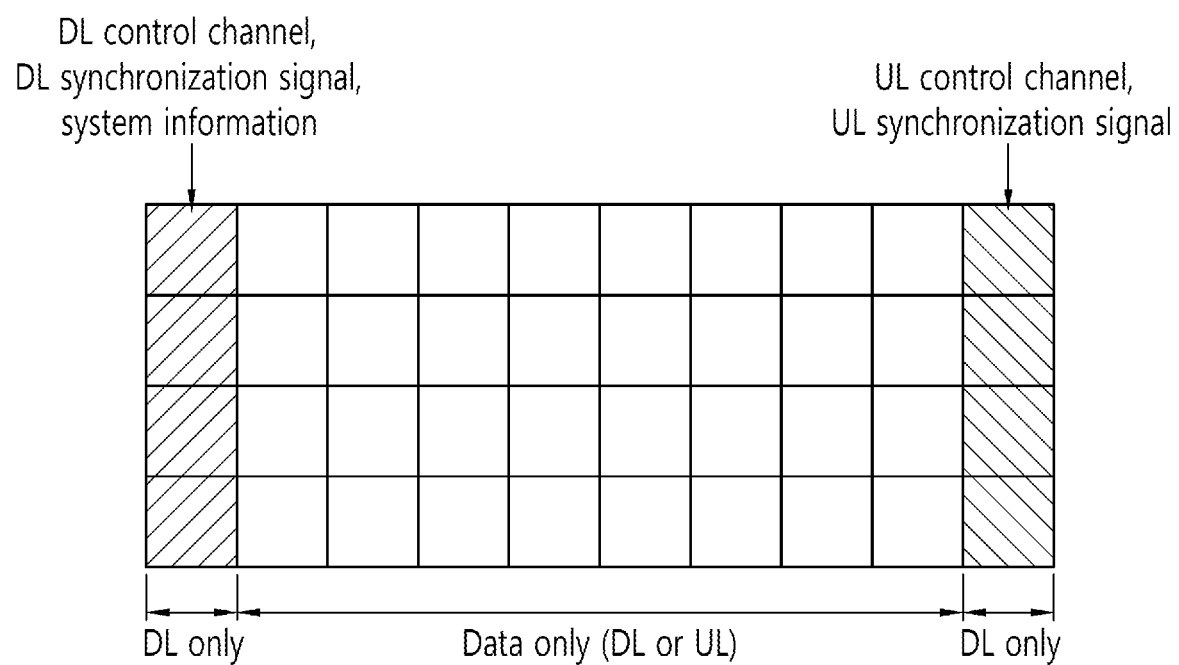
FIG. 9 shows an example of a structure of a self-contained frame in a TDD communication system according to an embodiment of the present specification.

FIG. 9 shows an example of a structure of a self-contained frame in a TDD communication system according to an embodiment of the present specification.

It is expected to provide a data transfer delay of 1 ms as a low-delay requirement of a next-generation wireless communication system. A structure of a self-contained frame in which a downlink control channel and an uplink control channel are always present in a single subframe has been proposed to secure the data transfer delay of 1 ms. As shown in FIG. 9, the structure of the self-contained frame is characterized in that a control channel and a data channel are subjected to time division. That is, the control channel and the data channel may be deployed in a TDM manner.

In the existing LTE system, an uplink control channel and a data channel are subjected to frequency division. Therefore, there is a limitation in estimating a channel characteristic of an uplink data channel by using a reference signal of the uplink control channel. However, in the structure of the self-contained frame, since the uplink control channel and the data channel are subjected to time division, it is possible to estimate channel quality of the data channel by using the reference signal of the control channel. A method of hopping a control channel for channel estimation by using such a characteristic has been proposed (Method of UL signal transmission for UL channel sounding). In addition, since a downlink data channel and an uplink control channel are subjected to time division in the structure of the self-contained frame, it is possible to estimate quality of the uplink control channel and the data channel by using the quality information of the downlink channel. That is, when the aforementioned method is applied, a similarity between the uplink control channel and the downlink data channel increases due to the channel reciprocity characteristic. It is possible to perform channel estimation for uplink data transmission by using the reference signal of the uplink control channel.

In a broadband system, it is difficult for a UE to transmit a signal in the entire band due to a power limitation of the UE. Therefore, when a reference signal for uplink channel estimation is to be transmitted, a method of dividing the entire band into a plurality of sub-bands and sequentially transmitting a reference signal in each sub-band may be used. However, in the broadband system, when an uplink reference signal is sequentially transmitted in all sub-bands, it may take a lot of time to transmit the reference signal. Thus, it is necessary to restrict a band for transmitting the uplink reference signal for channel estimation. Hereinafter, the sub-band may also be described as a partial band.

The present specification proposes a method in which a BS assigns a transmission band of an uplink reference signal to a UE on the basis of downlink channel quality estimated by the UE in a time division duplex (TDD) communication system. This method is effective because of a channel reciprocity characteristic of the TDD communication system. The uplink reference signal mentioned in the present specification includes a reference signal that can be used for uplink channel estimation, such as a sounding reference signal (SRS) of an LTE system.

The SRS is a reference signal transmitted for uplink scheduling by the UE to the BS. The BS estimates an uplink channel by using the received SRS, and uses the estimated uplink channel in the uplink scheduling. In addition, the SRS is transmitted through one SC-FDMA symbol in the subframe. An SC-FDMA symbol in a duration in which the SRS is transmitted is referred to as a sounding symbol. Herein, the sounding symbol is a last SC-FDMA symbol among 14 SC-FDMA symbols constituting the subframe. However, this is for exemplary purposes only, and thus the position and number of sounding symbols in the subframe may change variously.

The SRS is transmitted not in a control region but in a data region. The UE may transmit the SRS throughout the entire frequency band (or subcarrier) of the data region or may transmit the SRS through a portion of the frequency band of the data region. When the UE transmits the SRS throughout the portion of the frequency band, each subframe for transmitting the SRS may be subject to frequency hopping with different frequencies. Further, the UE may transmit the SRS by using only a subcarrier of an even or odd index. The UE may transmit the SRS either periodically or aperiodically.

The SRS may be transmitted in such a format that a specific cyclic shift value is applied to a base sequence. A Pseudo random Noise (PN) sequence, a Zadoff-Chu (ZC) sequence, or a Constant Amplitude Zero Auto Correlation (CAZAC) sequence generated by a computer may be used as the base sequence.

Figure 10:
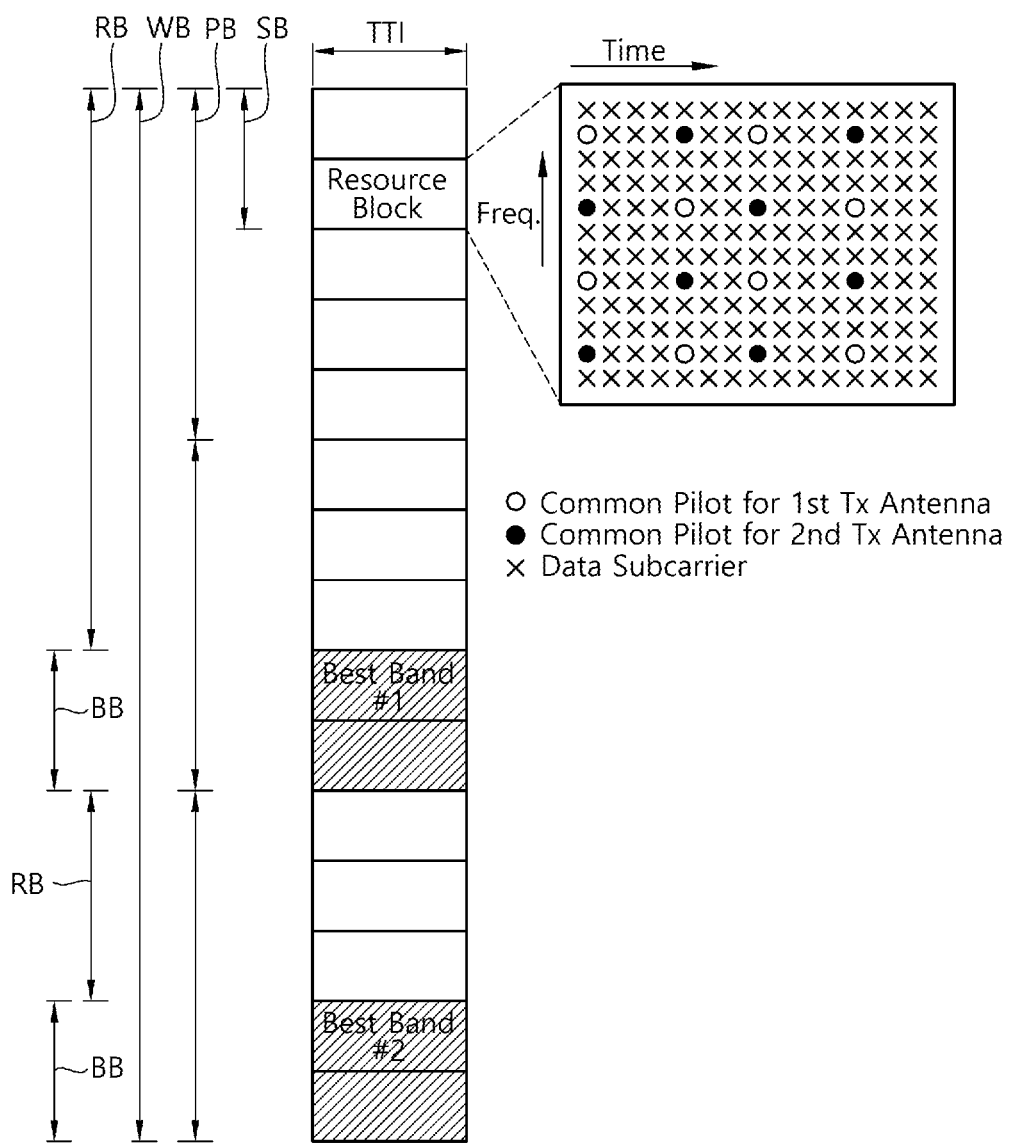
FIG. 10 shows an example of a granularity of a radio resource according to an embodiment of the present specification.

FIG. 10 shows an example of a granularity of a radio resource according to an embodiment of the present specification.

Referring to FIG. 10, user data and control signals are transmitted by being carried on a frame including a plurality of resource blocks. The frame may include a plurality of OFDM symbols in a time axis and a plurality of resource blocks in a frequency axis. The resource block is a basic unit of radio resource allocation, and includes a plurality of contiguous subcarriers. The resource block may include 12 subcarriers. The subcarrier includes a data subcarrier and a pilot subcarrier. The data subcarrier may carry the user data and the control signals. The pilot subcarrier may carry common pilots for respective antennas in a multi-antenna system. The data subcarrier and the pilot subcarrier may be arranged in various configurations in the resource block.

The radio resource may be divided in a frequency domain into a variety of granularities, e.g., a whole-band (WB), a PMI-band (PB), a sub-band (SB), etc. The SB represents a frequency band for carrying at least one control signal or user data. The SB may include at least one resource block. The PB includes at least one adjacent SB. The PB includes SBs having the same or similar PMIs. The WB represents a whole frequency band. A size relation of these bands may be SB PB WB.

According to a report type of feedback data, the radio resource may be divided in the frequency domain into a best band (BB) and a residual band (RB). The BB implies a set of specific SBs selected from a plurality of SBs. The RB represents a set of SBs remaining after excluding BBs from the WB. For example, when it is assumed that a CQI is transmitted using a best-N scheme (N=2), the CQI is obtained for each SB, and two SBs are selected from CQIs of respective SBs in a descending order of CQI values. The selected two SBs are used as BBs, and the remaining SBs are used as RBs. The CQIs of the two BBs may be transmitted without alteration, and the CQIs of the RBs may be transmitted as one average value by averaging CQIs of all SBs belonging to the RBs. Alternatively, the CQIs of the two BBs may be averaged so as to be transmitted as an average value, and the CQIs of the RBs may be transmitted as an average value by averaging CQIs of all SBs belonging to the RBs.

The best-N scheme is for selecting a set of specific N SBs from a plurality of SBs. In the best-N scheme, a UE may select a most preferred SB and report the selected SB to a BS. In the best-N scheme, a CQI of the selected SB may be represented with its original value or may be represented with an average value. A CQI of an RB may be represented with an average RB CQI, an average WB CQI, or the like.

The aforementioned frame structure and the granularity of the radio resource are provided for exemplary purposes only. Thus, a size of each band and the number of bands may be applied by being modified variously.

The reason of applying a variety of granularities is to reduce an overhead caused by feedback data and to effectively transmit the feedback data. For example, to provide a service with good quality of service (QoS) to a plurality of UEs, it is effective to obtain and transmit a CQI for each SB. However, since transmission of CQIs of all SBs results in an increase in the overhead, the UE transmits an original CQI by determining several SBs having good CQIs as BBs, and transmits only an average value of CQIs of the RBs.

The PMI is information required for performing pre-processing and post-processing on user data. The PMI may be obtained with respect to the SB, the PB, and the WB. The CQI is calculated based on the PMI and is then quantized. Thus, for correct CQI reporting, PMIs for all SBs have to be transmitted. However, transmission of the PMIs of all SBs results in an increase in an overhead. An unnecessary overhead may occur according to a size of the PB even in a case where a PMI for the PB is obtained and transmitted. When the PMI is obtained and transmitted in the same manner as a CQI transmission method, the unnecessary overhead may be reduced and correct CQI reporting may be achieved. One CQI and one PMI may be obtained and transmitted for the WB. In addition, the PB may have an equal or greater size than the BB. A PMI of the PB belonging to the BB may be transmitted together with a CQI of the BB.

The RI represents each of independent channels that can be multiplexed by multiple antennas. The RI may be obtained and transmitted in a WB unit.

Hereinafter, a method in which a BS assigns a transmission band of an uplink reference signal to a UE on the basis of downlink channel quality estimated by the UE will be described.

The UE determines a sub-band candidate to which an uplink reference signal is to be transmitted, and informs the BS of the sub-band candidate. The BS determines and informs a sub-band for transmitting the uplink reference signal among the sub-band candidates transmitted by the UE. Upon receiving this, the UE transmits the uplink reference signal in a corresponding sub-band. The UE may not explicitly inform the sub-band for transmitting the uplink reference signal. Instead, a downlink channel estimate value may be fed back to the BS.

When the UE transmits downlink channel estimation values for N sub-bands having best downlink channel quality, on the basis of this, the BS determines and informs of M sub-bands for transmitting the uplink reference signal.

For example, a case is assumed in which the UE transmits a best-N CQI by selecting N sub-bands having best downlink channel quality. The best-N CQI may correspond to N sub-bands selected in the best-N scheme, i.e., a CQI for each best-band (BB). In this case, the BS informs the UE of resource information of an uplink sub-band, to which best-1 CQI is mapped, through device-specific signaling. Alternatively, resource information of M uplink sub-bands to which best-N CQI is mapped is informed to the UE.

In another example, the UE selects N sub-bands having best downlink channel quality by using long period channel information such as reference signal received power (RSRP) and/or reference signal received quality (RSRQ) and informs the BS of the selected N-sub-bands. Upon receiving this, the BS informs the UE of resource information of an uplink sub-band to which best-1 RSRP and/or RSRQ are mapped. Alternatively, resource information of M uplink sub-bands to which best-N RSRP and/or RSRQ are mapped is informed to the UE.

In addition, the BS determines the number of sub-bands for transmitting an uplink reference signal and informs the UE of the determined number (case 1), or informs of the sub-band for transmitting the uplink reference signal in a bitmap manner among uplink sub-bands (case 2). For this, a method of selecting M uplink sub-bands corresponding to N downlink sub-bands having best channel quality is previously shared by the BS and the UE.

For example, a case is assumed in which the UE transmits a best-N CQI by selecting N sub-bands having best downlink channel quality. In this case, if the BS informs the UE that M=1, on the basis thereof, the UE knows that the uplink reference signal can be transmitted in an uplink sub-band to which the best-1 CQI is mapped. Alternatively, if the BS informs that M=3, the UE knows that the uplink reference signal can be transmitted in an uplink sub-band to which the best-1 CQI, best-2 CQI, and best-3 CQI are mapped.

For example, it is assumed that a bitmap for the uplink reference signal has a length of 3, and the UE transmits a best-N CQI by selecting N sub-bands having best channel quality. When the UE receives '100' from the BS, the UE knows that an uplink reference signal can be transmitted in an uplink sub-band to which the best-1 CQI is mapped. For another example, when receiving '011', the UE knows that the uplink reference signal can be transmitted in an uplink sub-band to which the best-2 CQI and best-3 CQI are mapped.

In order to apply the aforementioned method, a mapping rule between a downlink sub-band and an uplink sub-band shall be shared in advance. Hereinafter, an example of a mapping method between a downlink sub-band and an uplink sub-band is shown in FIG. 11 and FIG. 12.

Figure 11:
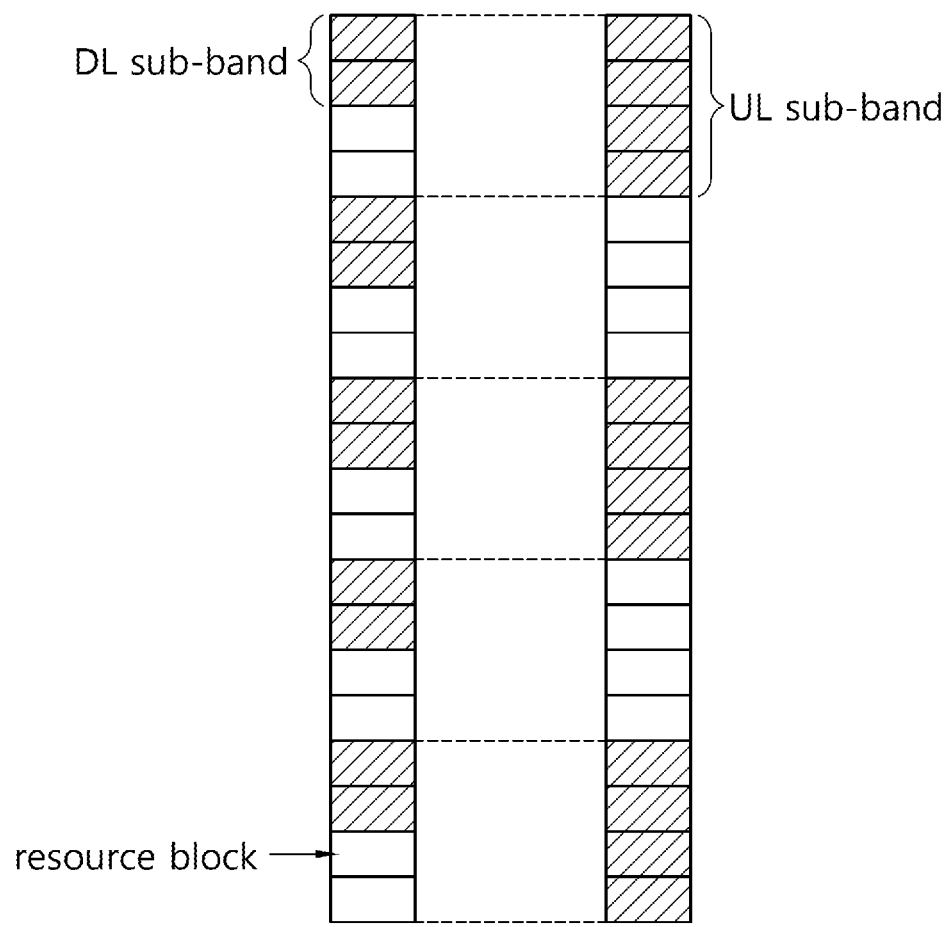
FIG. 11 shows an example of a mapping method between a downlink sub-band and an uplink sub-band according to an embodiment of the present specification.

FIG. 11 shows an example of a mapping method between a downlink sub-band and an uplink sub-band according to an embodiment of the present specification. FIG. 12 shows another example of a mapping method between a downlink sub-band and an uplink sub-band according to an embodiment of the present specification.

FIG. 11 shows a case where a width of the downlink sub-band is smaller than a width of the uplink sub-band. Assume that the total number of downlink sub-bands is $N_{total}$ and the total number of uplink sub-bands is $M_{total}$. The UE selects N sub-bands from the $N_{total}$ sub-bands and informs the BS of the N sub-bands, and the BS informs the UE of the M uplink sub-bands to which N sub-bands are mapped. Therefore, the number of bits for transmitting the M sub-bands is less than $M_{total}$, and M bits are required in total when a bitmap scheme is used.

Figure 12:
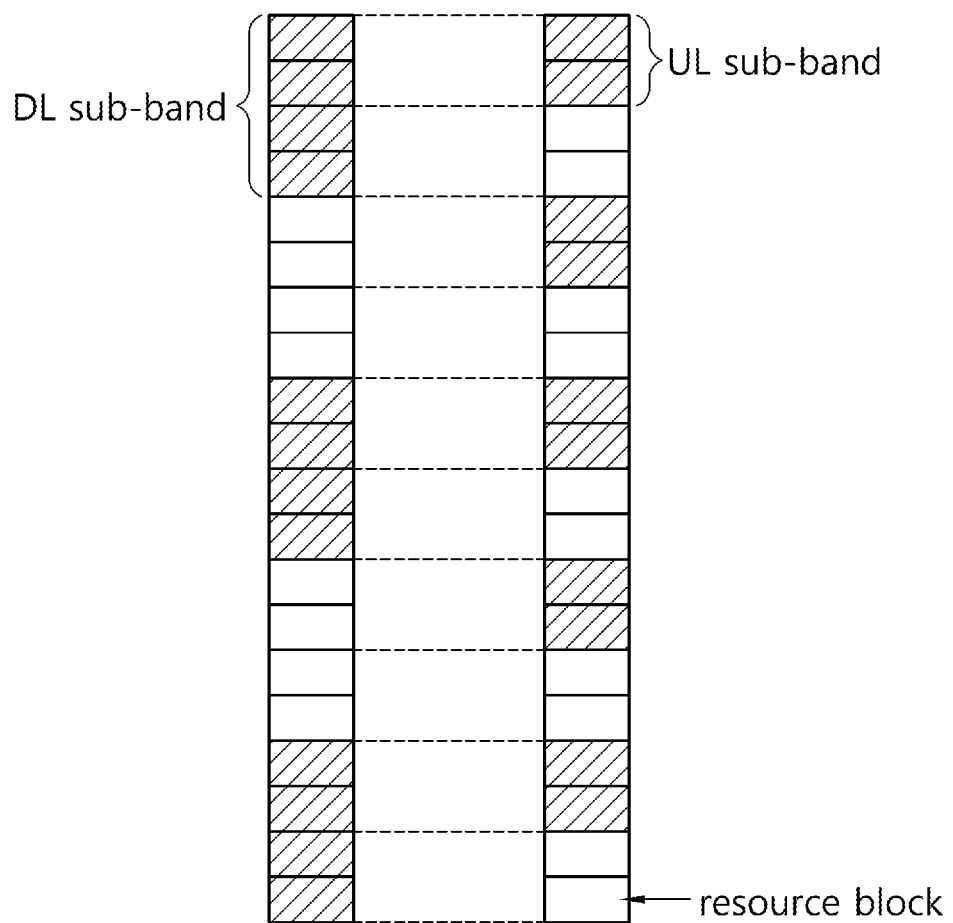
FIG. 12 shows another example of a mapping method between a downlink sub-band and an uplink sub-band according to an embodiment of the present specification.

FIG. 12 shows a case where a width of a downlink sub-band is greater than a width of the uplink sub-band. In this case, as shown in FIG. 12, since two uplink sub-bands are mapped to one downlink sub-band, a BS arbitrarily selects one of the two and informs the UE of the selected sub-band. In this case, if the BS is to inform the UE of a resource for an uplink reference signal in a bitmap manner, $M \times N_{total}/M_{total}$ bits are required to allocate up to M resources.

For another example, when sub-band information for uplink reference signal transmission is transmitted, resource information for transmitting an uplink reference signal is additionally transmitted in the sub-band. Specifically, L resources are configured in the sub-band through higher layer signaling. One of the L resources is determined through physical layer signaling.

Since a signaling overhead increases when allocation information of a uplink reference signal in a sub-band is determined every time, some candidate resource groups may be determined in advance through higher layer signaling, and then one of them may be determined through physical layer signaling.

In another example, the BS transmits the allocation information of the sub-band for the uplink reference signal transmission and the allocation information of the resources in the sub-band through physical layer signaling, and transmits other information, that is, the number M of uplink sub-bands mapped to a downlink sub-band, a subframe index of a subframe for transmitting an uplink reference signal, a transmission period of the uplink reference signal, and a transmission duration of the uplink reference signal through higher layer signaling.

The sub-band for the uplink reference signal needs to be changed depending on a channel state, but other information is not directly related thereto. Therefore, an overhead of physical layer signaling can be decreased by transmitting only sub-band information through physical layer signaling.

For another example, the BS transmits allocation information of a resource in a sub-band for transmission of an uplink reference signal through physical layer signaling, and transmits other information, i.e., allocation information of a sub-band for uplink reference signal transmission, the number M of uplink sub-bands mapped to a downlink sub-band, a subframe index of a subframe for transmitting the uplink reference signal, a transmission period of the uplink reference signal, a transmission duration of the uplink reference signal, or the like through higher layer signaling.

Figure 13:
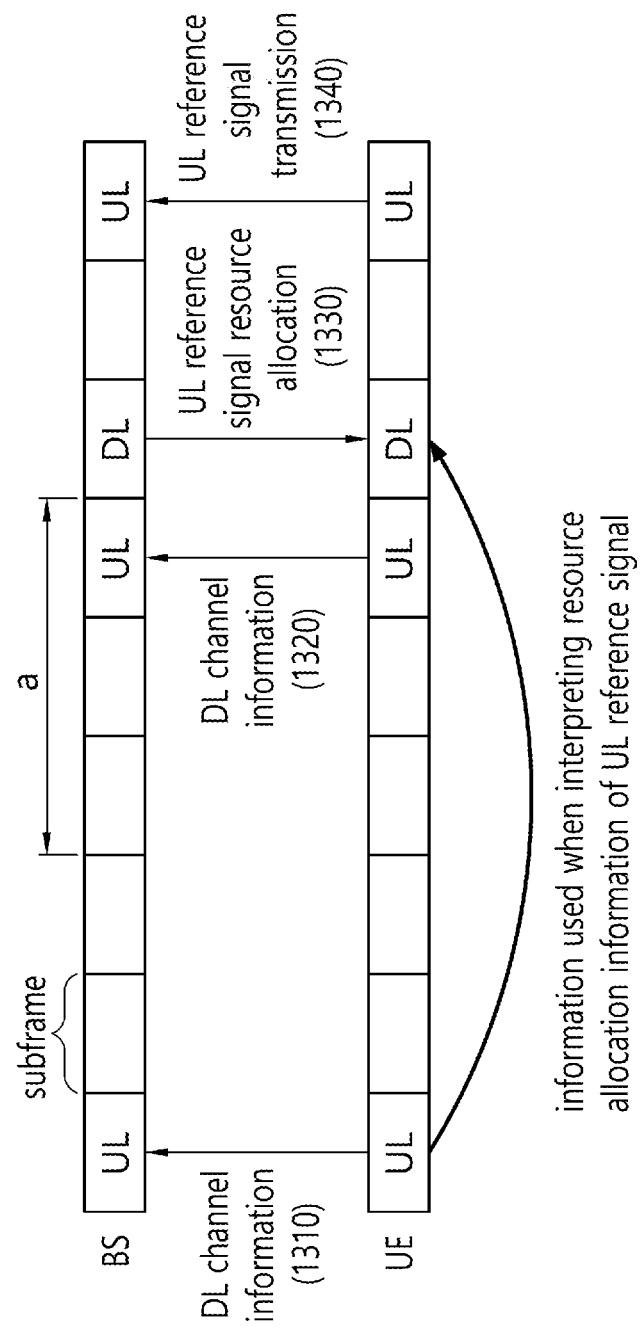
FIG. 13 shows an example of receiving resource allocation information of an uplink reference signal according to an embodiment of the present specification.

FIG. 13 shows an example of receiving resource allocation information of an uplink reference signal according to an embodiment of the present specification.

Referring to FIG. 13, when a UE receives resource allocation information 1330 of an uplink reference signal from a BS in a subframe n, the UE may interpret the resource allocation information 1330 of the uplink reference signal transmitted by the BS by using a value most recently transmitted among downlink channel quality values (downlink channel information 1310) transmitted before a subframe n-a.

A case is assumed in which the number of subframes required by the BS to process downlink channel information received from the UE is 'a'. For example, as shown in FIG. 13, when the UE transmits downlink channel information 1320 to the BS in a immediately previous subframe and receives the resource allocation information 1330 of an uplink reference signal in an immediately next subframe, the UE needs to interpret the resource allocation information 1330 of the uplink reference signal transmitted by the BS not with the downlink channel information 1320 transmitted in the immediately previous subframe but with the downlink channel information 1310 transmitted previously. The UE may transmit an uplink reference signal 1340 through a resource allocated according to the resource allocation information 1330 of the uplink reference signal.

For another example, the UE performs frequency hopping in a sub-band when transmitting an uplink reference signal. The UE performs frequency hopping in each sub-band when M sub-bands are allocated. Since a sub-band may have a sufficiently large number of subcarriers in a broadband system, it is reasonable that the uplink reference signal is transmitted only in some resources in the sub-band. All of uplink channel characteristics in the sub-band may be recognized by performing frequency hopping of the uplink reference signal in the sub-band.

The BS delivers a frequency hopping pattern in the sub-band to the UE. A method of delivering the frequency hopping pattern includes: (1) a method of determining a frequency hopping pattern for each sub-band to change the frequency hopping pattern for each sub-band; and (2) a method of delivering only a frequency hopping pattern of one sub-band and directly applying this to other sub-bands.

If different frequency hopping patterns can be allocated for each sub-band, there is an advantage in that a degree of freedom for scheduling of the BS increases, whereas there is a disadvantage in that an overhead of physical layer signaling increases. Therefore, in order to reduce the overhead of physical layer signaling, a method may be necessary in which sub-bands have the same frequency hopping pattern even if the sub-bands are different.

For another example, when signaling for allocation of the uplink reference signal proposed in the present specification is transmitted through physical layer signaling and a transmission resource of the uplink reference signal is allocated through higher layer signaling, resource allocation of the uplink reference signal transmitted through physical layer signaling is preferentially applied.

Although a CQI is mainly cited in the above description as information for informing downlink channel quality, the present specification is not limited thereto. As the information for informing the downlink channel quality, information of short-cycle channel quality such as PMI, RI, etc., may be utilized, and information of long-cycle channel quality such as RSRP and/or RSRQ may also be utilized.

Figure 14:
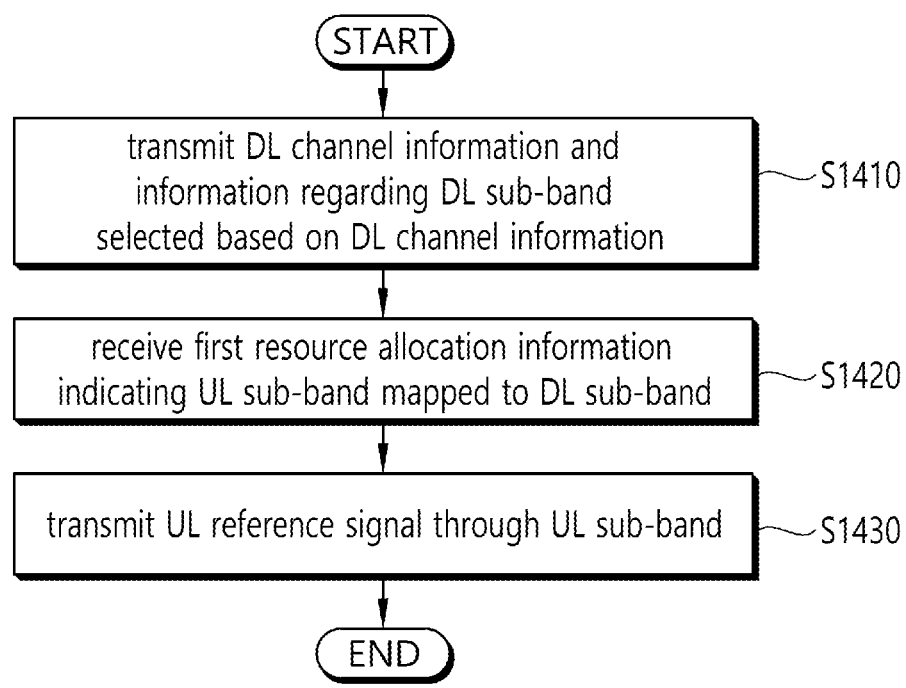
FIG. 14 is a flowchart showing a procedure of transmitting an uplink reference signal according to an embodiment of the present specification.

FIG. 14 is a flowchart showing a procedure of transmitting an uplink reference signal according to an embodiment of the present specification.

First, terminologies will be summarized. A radio resource used in a wireless communication system described in the present specification may be classified into a best band (BB) and a residual band (RB) in a frequency domain. The BB may correspond to a specific sub-band selected from a plurality of sub-bands. The RB may correspond to sub-bands remaining after excluding the BB from a whole band. The whole band may include the plurality of sub-bands. An uplink channel may include an uplink control channel or an uplink data channel. The downlink channel may include a downlink control channel or a downlink data channel.

First, in step S1410, a UE transmits downlink channel information and information regarding a downlink sub-band selected based on the downlink channel information to a BS.

The downlink sub-band may be a best band in which quality of a downlink channel is higher than a predetermined value among a plurality of sub-bands. In addition, the downlink channel information may include a CQI of the best band, RSRP of the best band, or RSRQ of the best band. That is, in a broadband TDD communication system, the UE has to first transmit downlink channel information to the BS for beam scanning. Accordingly, the UE may transmit a downlink channel estimation value of a downlink channel having good quality and may inform the BS of information regarding a downlink sub-band having good downlink channel quality.

In step S1420, the UE receives first resource allocation information, which indicates an uplink subframe mapped to the downlink sub-band, from the BS.

In step S1430, the UE transmits an uplink reference signal to the BS through the uplink sub-band.

In addition, the UE may receive second resource allocation information which indicates a resource in the uplink sub-band. The uplink reference signal may be transmitted through the resource in the uplink sub-band on the basis of the second resource allocation information. The first resource allocation information may correspond to allocation information regarding an uplink sub-band mapped to a downlink sub-band selected by the UE. The second resource allocation information may correspond to allocation information regarding a specific resource for which an uplink reference signal is transmitted in the uplink sub-band.

For example, the first resource allocation information and the second resource allocation information are received through physical layer signaling. At least one of the number of uplink sub-bands, a subframe index in a resource in the uplink sub-band, a transmission period of the uplink reference signal, and a transmission duration of the uplink reference signal may be received through higher layer signaling. The subframe index of the resource in the uplink sub-band may correspond to an index of a subframe in which an uplink reference signal is transmitted. Only allocation information of the uplink sub-band may be transmitted through physical layer signaling, and the remaining information may be transmitted through higher layer signaling, thereby decreasing an overhead of the physical layer signaling.

For another example, the second resource allocation information is received through the physical layer signaling. At least one of the first resource allocation information, the number of uplink sub-bands, a subframe index in a resource in the uplink sub-band, a transmission period of the uplink reference signal, and a transmission duration of the uplink reference signal may be received through higher layer signaling. The subframe index of the resource in the uplink sub-band may correspond to an index of a subframe in which an uplink reference signal is transmitted.

For another example, the downlink channel information is transmitted in a second subframe which is ahead, by a predetermined value, of a first subframe in which the first resource allocation information and the second resource allocation information are received. The first resource allocation information and the second resource allocation information may be determined based on the downlink channel information. This is an example of showing a case where a time corresponding to a specific subframe is required to process downlink channel information received by the BS from the UE. That is, if the downlink channel information is processed and the first resource allocation information and the second resource allocation information are received within the specific subframe, the first resource allocation information and the second resource allocation information cannot be interpreted by using the downlink channel information.

For another example, the resource in the uplink sub-band is subjected to frequency hopping for each of the uplink sub-bands. A pattern of the frequency hopping performed for each of the uplink sub-bands is configured identically. That is, the UE may transmit an uplink reference signal for the resource subjected to frequency hopping within the uplink sub-band. This is because a sub-band also has sufficient subcarriers in a broadband system. In addition, when the pattern of frequency hopping varies for each sub-band, a degree of freedom of scheduling of the BS may increase, but an overhead of physical layer signaling may increase. Therefore, the BS identically sets the pattern of frequency hopping of each uplink sub-band.

In addition, the first resource allocation information may include bitmap information indicating a sub-band for transmitting the uplink reference signal among the uplink sub-bands. Therefore, the BS may inform that an uplink reference signal can be transmitted for all uplink sub-band mapped to the downlink sub-band, or may inform that the uplink reference signal can be transmitted only in a specific sub-band indicated by the bitmap information of the uplink sub-band mapped to the downlink sub-band.

A subframe used in the wireless communication system described in the present specification may correspond to a self-contained frame. The first subframe and the second subframe may also correspond to the self-contained frame. That is, a symbol for transmitting downlink channel information, a symbol for transmitting data, and a symbol for transmitting uplink channel information are deployed in a time division multiplexing (TDM) manner in the subframe. According to a channel reciprocity characteristic based on the self-contained frame, a similarity between an uplink control channel and a downlink control channel may increase.

Figure 15:
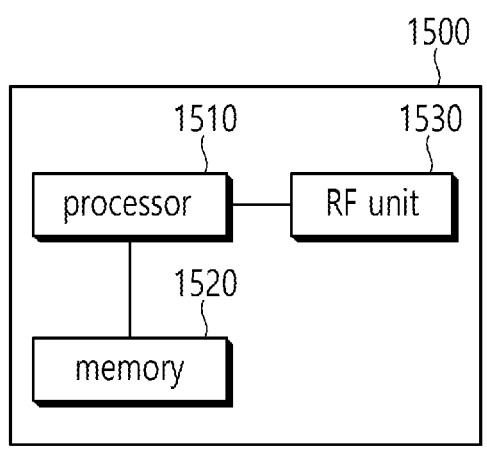
FIG. 15 is a block diagram showing a device for wireless communication for implementing an embodiment of the present invention.

FIG. 15 is a block diagram showing a device for wireless communication for implementing an embodiment of the present invention.

A device 1500 for wireless communication includes a processor 1510, a memory 1520 and a radio frequency (RF) unit 1530.

The processor 1510 may be configured to implement proposed functions, procedures and/or methods described in this description. Layers of the radio interface protocol may be implemented in the processor 1510. The processor 1510 may handle a procedure explained above. The memory 1520 is operatively coupled with the processor 1510, and the RF unit 1530 is operatively coupled with the processor 1510.

The processor 1510 may include application-specific integrated circuit (ASIC), other chipset, logic circuit and/or data processing device. The memory 1520 may include read-only memory (ROM), random access memory (RAM), flash memory, memory card, storage medium and/or other storage device. The RF unit 1530 may include baseband circuitry to process radio frequency signals. When the embodiments are implemented in software, the techniques described herein can be implemented with modules (e.g., procedures, functions, and so on) that perform the functions described herein. The modules can be stored in memory 1520 and executed by processor 1510. The memory 1520 can be implemented within the processor 1510 or external to the processor 1510 in which case those can be communicatively coupled to the processor 1510 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of transmitting an uplink reference signal by a terminal in a wireless communication system, the method comprising:
   transmitting (i) downlink channel information and (ii) information regarding a downlink sub-band selected based on the downlink channel information;
   receiving first resource allocation information regarding an uplink sub-band mapped to the downlink sub-band through physical layer signaling;

receiving, through higher layer signaling, at least one of (i) a number of uplink sub-bands, (ii) a subframe index of a resource in the uplink sub-band, (iii) a transmission period of the uplink reference signal, or (iv) a transmission duration of the uplink reference signal;

receiving, through physical layer signaling, second resource allocation information regarding a resource in the uplink sub-band; and transmitting the uplink reference signal through the resource, wherein the downlink channel information is transmitted in a second subframe which is ahead, by a predetermined value, of a first subframe in which the first resource allocation information and the second resource allocation information are received, wherein the first subframe and the second subframe are included in a self-contained frame, and wherein the first subframe, the second subframe, first symbols for receiving the second resource allocation information, and second symbols for transmitting the uplink reference signal are deployed in the self-contained frame.

2. The method of claim 1,
wherein the downlink sub-band is a best band, among a plurality of sub-bands, in which quality of a downlink channel is higher than a predetermined value, and
wherein the downlink channel information includes (i) a channel quality indicator (CQI) of the best band, (ii) reference signal received power (RSRP) of the best band, or (iii) reference signal received quality (RSRQ) of the best band.

3. The method of claim 1,
wherein the first resource allocation information and the second resource allocation information are determined based on the downlink channel information.

4. The method of claim 1,
wherein the resource in the uplink sub-band is subjected to frequency hopping for each of the uplink sub-bands, and
wherein a pattern of the frequency hopping performed for each of the uplink sub-bands is configured identically.

5. The method of claim 1, wherein the first resource allocation information includes bitmap information regarding a sub-band, among the uplink sub-bands, for transmitting the uplink reference signal.

6. A terminal configured to transmit an uplink reference signal in a wireless communication system, the terminal comprising:
a transceiver;
at least one processor; and
at least one computer memory operatively coupled to the at least one processor and storing instructions that, based on being executed by the at least one processor, perform operations comprising:
transmitting, via the transceiver, (i) downlink channel information and (ii) information regarding a downlink sub-band selected based on the downlink channel information;
receiving, through physical layer signaling via the transceiver, first resource allocation information regarding an uplink sub-band mapped to the downlink sub-band;
receiving, through higher layering signaling via the transceiver, at least one of (i) a number of uplink sub-bands, (ii) a subframe index of a resource in the uplink sub-band, (iii) a transmission period of the uplink reference signal, or (iv) a transmission duration of the uplink reference signal;
receiving, through physical layer signaling via the transceiver, second resource allocation information regarding a resource in the uplink sub-band; and
transmitting, via the transceiver, the uplink reference signal through the resource,
wherein the downlink channel information is transmitted in a second subframe which is ahead, by a predetermined value, of a first subframe in which the first resource allocation information and the second resource allocation information are received,
wherein the first subframe and the second subframe are included in a self-contained frame, and
wherein the first subframe, the second subframe, first symbols for receiving the second resource allocation information, and second symbols for transmitting the uplink reference signal are deployed in the self-contained frame.

7. The terminal of claim 6,
wherein the downlink sub-band is a best band, among a plurality of sub-bands, in which quality of a downlink channel is higher than a predetermined value, and
wherein the downlink channel information includes (i) a channel quality indicator (CQI) of the best band, (ii) reference signal received power (RSRP) of the best band, or (iii) reference signal received quality (RSRQ) of the best band.

8. The terminal of claim 6,
wherein the first resource allocation information includes bitmap information regarding a sub-band, among the uplink sub-bands, for transmitting the uplink reference signal.

9. The terminal of claim 6,
wherein the first resource allocation information and the second resource allocation information are determined based on the downlink channel information.

10. The terminal of claim 6,
wherein the resource in the uplink sub-band is subjected to frequency hopping for each of the uplink sub-bands, and
wherein a pattern of the frequency hopping performed for each of the uplink sub-bands is configured identically.

11. A processing apparatus configured to control a terminal to transmit an uplink reference signal in a wireless communication system, the processing apparatus comprising:
at least one processor; and
at least one computer memory operatively coupled to the at least one processor and storing instructions that, based on being executed by the at least one processor, perform operations comprising:
transmitting (i) downlink channel information and (ii) information regarding a downlink sub-band selected based on the downlink channel information;
receiving, through physical layering signaling, first resource allocation information regarding an uplink sub-band mapped to the downlink sub-band;
receiving, through higher layer signaling, at least one of (i) a number of uplink sub-bands, (ii) a subframe index of a resource in the uplink sub-band, (iii) a transmission period of the uplink reference signal, or (iv) a transmission duration of the uplink reference signal;
receiving, through physical layer signaling, second resource allocation information regarding a resource in the uplink sub-band; and
transmitting the uplink reference signal through the resource, wherein the downlink channel information is transmitted in a second subframe which is ahead, by a predetermined value, of a first subframe in which the first resource allocation information and the second resource allocation information are received, wherein the first subframe and the second subframe are included in a self-contained frame, and wherein the first subframe, the second subframe, first symbols for receiving the second resource allocation information, and second symbols for transmitting the uplink reference signal are deployed in the self-contained frame.

12. The processing apparatus of claim 11, wherein the downlink sub-band is a best band, among a plurality of sub-bands, in which quality of a downlink channel is higher than a predetermined value, and wherein the downlink channel information includes (i) a channel quality indicator (CQI) of the best band, (ii) reference signal received power (RSRP) of the best band, or (iii) reference signal received quality (RSRQ) of the best band.

13. The processing apparatus of claim 11, wherein the first resource allocation information includes bitmap information regarding a sub-band, among the uplink sub-bands, for transmitting the uplink reference signal.

* * * * *